(12) United States Patent
Ceccolini

(10) Patent No.: US 9,922,630 B2
(45) Date of Patent: Mar. 20, 2018

(54) SYSTEM, APPARATUS AND METHOD FOR FOOT-OPERATED EFFECTS

(71) Applicant: Gianfranco Ceccolini, São Paulo (BR)

(72) Inventor: Gianfranco Ceccolini, São Paulo (BR)

(73) Assignee: MOD DEVICES GmbH, Berlin (DE)

(*) Notice: Subject to any disclaimer, the term of this patent is extended or adjusted under 35 U.S.C. 154(b) by 2 days.

(21) Appl. No.: 14/716,782

(22) Filed: May 19, 2015

(65) Prior Publication Data

US 2015/0262566 A1    Sep. 17, 2015

Related U.S. Application Data

(63) Continuation-in-part of application No. 14/110,911, filed as application No. PCT/BR2012/000107 on Apr. 11, 2012, now abandoned.

(30) Foreign Application Priority Data

Apr. 11, 2011    (BR) .................................. 9100858 U

(51) Int. Cl.
| | |
|---|---|
| *G10H 1/34* | (2006.01) |
| *G10H 1/32* | (2006.01) |
| *G10H 1/02* | (2006.01) |
| *G10H 1/00* | (2006.01) |
| *G10H 3/00* | (2006.01) |
| *G06F 3/01* | (2006.01) |
| *G06F 3/16* | (2006.01) |

(Continued)

(52) U.S. Cl.
CPC ............ *G10H 1/348* (2013.01); *G06F 3/011* (2013.01); *G06F 3/0482* (2013.01); *G06F 3/0486* (2013.01); *G06F 3/04817* (2013.01); *G06F 3/162* (2013.01); *G10H 1/0058* (2013.01); *G10H 1/0091* (2013.01); *G10H 1/02* (2013.01); *G10H 1/32* (2013.01); *G10H 2210/265* (2013.01); *G10H 2210/281* (2013.01); *G10H 2220/116* (2013.01); *G10H 2240/285* (2013.01)

(58) Field of Classification Search
CPC .......... G10H 1/02; G10H 1/32; G10H 1/0091; G10H 1/348; G10H 2210/265; G10H 2210/281; G06F 3/011
USPC .................................................... 84/746, 626
See application file for complete search history.

(56) References Cited

U.S. PATENT DOCUMENTS

| | | | | |
|---|---|---|---|---|
| 6,689,947 B2* | 2/2004 | Ludwig | .................... | G10H 1/00 84/645 |
| 8,338,689 B1* | 12/2012 | Beaty | .................. | G10H 1/0091 84/718 |

(Continued)

*Primary Examiner* — David Warren
*Assistant Examiner* — Christina Schreiber
(74) *Attorney, Agent, or Firm* — Raymond Van Dyke; Van Dyke Law

(57) ABSTRACT

A foot-operated pedal for programming audio and other effects, including an HMI or Human-Machine Interface that digitally communicates with a CPU, providing the parameters of effects set by the user, where a PC Interface is responsible for the mediation of the communication between the CPU and an external computer used to program the settings and adjustments of the device, with the audio interface having the function of promoting the compatibility between the electrical signal from the musical instrument and the CPU. A graphical user interface to facilitate the creation of an audio effect using icons, a given configuration of icons and interconnections being modeled and employed to generate a given audio effect.

9 Claims, 10 Drawing Sheets

(51) Int. Cl.
*G06F 3/0482* (2013.01)
*G06F 3/0481* (2013.01)
*G06F 3/0486* (2013.01)

(56) References Cited

U.S. PATENT DOCUMENTS

| | | | | |
|---|---|---|---|---|
| 2004/0016338 | A1* | 1/2004 | Dobies | G10H 1/0091 84/662 |
| 2004/0136549 | A1* | 7/2004 | Pennock | G10H 1/02 381/119 |
| 2006/0011052 | A1* | 1/2006 | Purchon | G10H 1/0091 84/746 |
| 2007/0234880 | A1* | 10/2007 | Adams | G10H 1/0066 84/601 |
| 2010/0269670 | A1* | 10/2010 | O'Connor | G10H 1/0091 84/626 |
| 2011/0084902 | A1* | 4/2011 | Logue | G06F 3/011 345/157 |
| 2014/0090546 | A1* | 4/2014 | Ceccolini | G10H 1/02 84/626 |
| 2015/0262566 | A1* | 9/2015 | Ceccolini | G10H 1/348 84/746 |
| 2017/0124997 | A1* | 5/2017 | Blaschke | G10H 1/0058 |

* cited by examiner

SYSTEM, APPARATUS AND METHOD FOR FOOT-OPERATED EFFECTS

CROSS REFERENCE TO RELATED APPLICATIONS

The present invention is a continuation-in-part application claiming priority from U.S. patent application Ser. No. 14/110,911, entitled "SYSTEM, APPARATUS AND METHOD FOR FOOT-OPERATED EFFECTS," filed Dec. 18, 2013, which is a National Stage Entry of PCT Patent Application Serial No. PCT/BR2012/000107, filed Apr. 11, 2012, and Brazil Patent Application No. MU 910085-1, filed Apr. 11, 2011, and the subject matters of all of these earlier disclosures are incorporated by reference herein.

FIELD OF THE INVENTION

The present invention is directed to systems, devices, methods and tools designed to provide special effects and distortions on audio signals from musical instruments and microphones, allowing the configuration and recording of different effects, encapsulated in the form of plug-ins, directly on the device herein identified as a foot-operated pedal.

BACKGROUND OF THE INVENTION

Foot-operated pedals employed for distortion are well known among musicians, becoming popular since the 1970s for stage performances, sound recordings and other purposes. For example, effects can be applied to audio, such as from electrical guitars or other instruments, or vocals from microphones, such as during a live performance.

With the use of foot-operated devices to control these audio or signal alterations, the output or effect of the changes altering these audio inputs, e.g., through distortion or delay, can improve or enhance the performance.

Although the prior art generally discusses that the effects able to be produced are unlimited, prior art foot pedals are only able to store a limited set of effects therein, i.e., the pedals now known are unable to contain a plethora of effects in order to adapt to the personal preferences of each musician or to meet diverse needs.

Accordingly, one of the drawbacks with respect to conventional pedals concerns the limitation of the audio effects stored on a same device, which ultimately limit the musical possibilities of the users, forcing them to acquire more than one pedal to obtain the desired effects or close to what they desire.

As an alternative to confer greater flexibility for possible effects, several software programs for PCs have emerged, capable of programming different effects and distortions by connecting the PC to microphones and musical devices, such as electric guitars. A drawback of this configuration, however, is the low portability of the set, and its low robustness, as compared to the pedals when subjected to the hostile environment of the stage, where vibrations and relatively high temperatures are common.

The ongoing transformation of PCs into specific hardware devices continues and there are many applications in the market, for example, current data network routers, multimedia stations, and video game consoles, among other applications.

Along the same lines, various initiatives have recently emerged that aim at providing "programmable" pedals, using proprietary programming languages, such as VST (Virtual Studio Technology) plug-ins, as noted in the description of U.S. Patent Application Publication No. US2010/0269670, published on Oct. 28, 2010, which although an improvement, continues to restrict the creative options of users since adding new effects binds them to the purchase of a software license (VST), and greatly limits the availability of combinations and serial effects assembly. Additionally, the above art fails to allow parallel effects assembly, fails to include metadata capability (for plug & play), or any real plug & play since the reference requires hardcoded programming, and exhibits various other drawbacks discussed hereinbelow.

It is, therefore, an objective of the present invention to provide a foot-operated device that has flexible plug & play and other capabilities to accept new devices connected thereto, whether in serial or parallel effects assemblies.

It is a further objective of the present invention to employ metadata to facilitate plug& play and other capabilities.

It is another objective of the present invention to allow unlimited device or gadget connectivity combinations.

It is yet another objective of the present invention to provide improved networking and interfacing capabilities, such as by employing Linux Audio Developer's Simple Plugin, version 2, or LADSPA 2, or LV2, as the application program interface, and allowing an IP address association.

It is a further objective of the present invention to provide a graphical user interface tool to facilitate the creation and use of audio effects, allowing musicians and other creatures to better visualize the creative process and hear the audio effects generated, allowing great permutations and dynamic configuration and reconfiguration of effects.

Accordingly, the objectives of the instant invention are more broadly directed to providing a solution to the aforementioned drawbacks of the prior art, being able to confer the portability of the current pedals associated with the total flexibility of programming of PCs, and also the convenience provided by the use of open programming standards and languages available to users so that they can program, configure, parameterize and write their own effects in a single pedal, exempting them from acquiring more than one device or software usage license, and giving them complete freedom of musical creation through a single device.

SUMMARY OF THE INVENTION

The present invention is directed to an improved foot-operated pedal for programming audio and other effects, including an HMI or Human-Machine Interface that digitally communicates with a CPU, providing the parameters of effects set by the user, where a PC Interface is responsible for the mediation of the communication between the CPU and an external computer used to program the settings and adjustments of the device, with the audio interface having the function of promoting the compatibility between the electrical signal from the musical instrument and the CPU.

The present invention is further directed to the use of graphical user interfaces and other software tools to facilitate the creation, modeling, generation and experimentation of sound effects. Accordingly, the systems and devices, along with the software and methodologies, that improve the entire creative process are contemplated and considered as part of the instant invention.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

Figure 1:
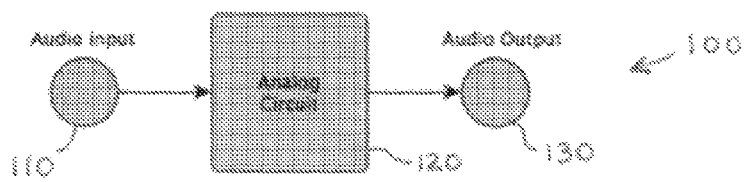
FIG. 1 illustrates a conventional audio processor configuration.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The overall philosophy driving the present invention is the basic principle that human beings have the vital necessity to express their emotions and communicate with one another. Expression can happen in multiple forms and art is one of them. Art has creativity and emotion as its main driving forces. Communication can also happen in multiple ways, ranging from verbal eye-to-eye contact to online worldwide messaging, and can have many objectives, from the simple exchange of information to self-promotion and learning.

On both processes, expressing and communicating, the use of a tool plays an important role. A tool extends the limits of the body and turns the creative content into reality. For example, a painter can paint with his fingers, but a specific brush can bring results unobtainable with the bare use of his hand. Two people may talk to each other with no devices, but that requires them to be close to each other. Telephones make it possible for the same conversation to happen within miles of distance.

In the present invention, there is, therefore, the belief that the instant tool must have some characteristics in order to fulfill its function, and, in a more utopian view, the tool must be (1) precise enough to enable the artist to fulfill his needs, (2) ergonomic in a way that it does not pose an obstacle to the creative process, (3) flexible enough in order to work in the widest variety of contexts, (4) long lasting to the point that the artist can develop trust in it, and (5) evolvable in order to adapt to the artist's development.

With the above in mind, applicant has found that in the use of prior art effects processors, such as for foot operability, a musician finds himself confronting one or more of the following problems: (1) poor connections or networking between the artist and developer, the teacher and student, the idol and fan, and so forth, (2) the traffic between different instruments is via analog circuitry, (3) the use of a variety of different audio effects devices is impossible—cannot try all installation effects on current devices, (4) the variety of ways to act on the effects, such as by control chain, is limited, (5) there is great difficulty in finding a timbre, despite the many options and variables available in the Cloud, (6) it is difficult to program these effects without the use of a desktop PC, whereas the use of a variety PCs (desk, tablet, phone) is now possible, albeit with a single language requirement, (7) the use of multiple physical links is not possible, and (8) the threat of obsolescence is pervasive.

The audio processing devices of the prior art, such as those described hereinabove, employ dedicated hardware and software that are aimed towards one particular instrument (or group of instruments) and perform a pre-defined function or set of functions. Indeed, there is little flexibility of use or creation.

A general proposition of the present invention is for a multipurpose device, that accepts multiple instruments (such as by means of hardware adjustment) and performs different functions (such as by means of software configuration), as is understood in the art.

In particular, a multipurpose audio processor, pursuant to the principles of the present invention, preferably fulfills the following requirements and includes: (1) adjustable analog circuitry for inputs and outputs in order to connect any of the existing electric signals; and (2) a general purpose CPU architecture in order to use available code from desktops and mobiles, so that this code can be more easily ported.

Additional features of the instant invention include network-based access for control and configuration involving various functionalities, including: (1) the installation and removal of plugins, (2) drag and drop, (3) freely arrange and connect, (4) multiple connections, (5) address controls, (6) control metadata, (7) multiple modes—depending on actuator, (8) extend controllers—control chain, (9) driver included/descriptor, (10) save and store arrangements for live use, (11) share/download arrangements, and (12) record sample and generate video.

The present invention preferably includes a live audio processor in which one can install and remove plugins, and in which one can arrange the internal connections between plugins (graph) to which one can plug in different instruments, which enables the musician to participate on a dedicated social network, and which permits any developer to produce code for it.

In particular, the present invention is directed to a foot-operated device that lets the user: (1) install and remove audio plugins; (2) freely combine and connect the plugins, creating virtual pedalboards; (3) select which hardware actuator controls which plugin parameter, if any; (4) extend its hardware controls with external controllers; and (5) connect to any web enabled device (PC, tablet, mobile phone), thereby totally configuring and programming the device, with a seamless plugin installation—drag and drop—from cloud to device, and participating on a social network—with the ability to share and try pedalboards.

As is known in the art, some sound sources directly produce electric signals—keyboards, iPod, etc.—and some use some kind of transducer, like a pickup or microphone, in order to convert the original acoustic signal into an electrical signal. Once the sound has been "electrified" it is then carried by a conductor to an amplifier or recorder, here designated as "sound receivers."

A live audio processor is a device which is connected (or plugged) between the sound source and the sound receiver and processes the electric signal in "real time" as the audio stream is flowing. To process the signal means to modify it in any way that the signal received by the receiver is different than the one sent by the source. Some devices "enrich" the sound adding "color" to the tone, others degrade the sound, causing distortion, and others simply copy the sound and delay or loop it. The particular sound manipulations or changes depend on the user's needs or tastes.

With reference now to FIG. 1 of the DRAWINGS, there is illustrated therein a classic or basic audio processor, generally designated by the reference numeral 100, where the signal flows from an audio input 110 to an audio output 130, passing through an analog circuit 120.

It should be understood that due to the physical characteristics and behavior of the analog circuit 120, the signal sent to the output 130 is different from the one fed to the input 110, and the alteration of the signal is vaguely called "effect," and will be referred to this way throughout the text.

As is understood in the art, effects can be activated/deactivated, and most effects have parameters to be adjusted, where the amount of distortion, the delay time, the filter frequency are some of them. Being so, most processors feature one or more buttons in order to set the parameters to the musician's needs, and are positioned on the floor in order to be activated/deactivated with the use of the feet, as described in more detail hereinbelow. Also, some processors feature foot-adjustable parameters that were developed in order to allow the musician to change an effect's parameter while playing (an expression pedal).

Figure 2:
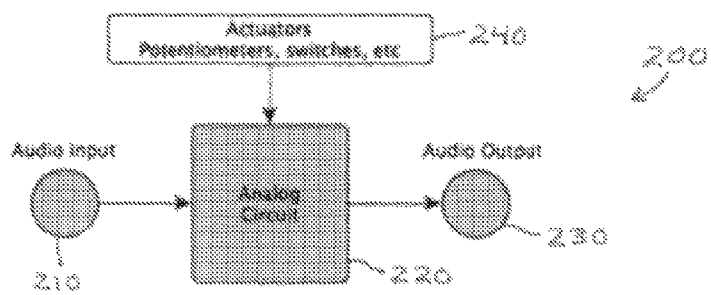
FIG. 2 illustrates an improvement to the audio processor configuration as shown in FIG. 1, which includes some controls.

With reference now to FIG. 2 of the DRAWINGS, there is illustrated therein a controlled or controllable audio processor, generally designated by the reference numeral 200, where the signals entering an audio input 210, are modified by actuators, generally designated by the reference numeral 240, connected to an analog circuit 220, and where the effects are made manifest via an audio output 230. In order to "adjust" the effects to one's needs, analog circuits 220 often feature variable state components or actuators 240, which preferably include potentiometers, switches, and like components, that alter the circuit's physics, thereby altering the resulting "effect."

As noted, devices of this kind have been used since the end of the 1950's and the music itself has largely been influenced by the use of such devices. In fact, entire music genres have been created around the use of these analog sound processors, and they became, together with the instrument, the musician's most important tools.

In the beginning, the audio processors included mainly the described analog circuits 120/220, in which the effect was a result of the physical behavior of the circuit. It should be understood that in this scenario, there is a natural and unbreakable bond between the hardware and the effect it produces, and the effect could only be duplicated, if at all, with the identical equipment, making flexibility and modularity impossible.

In the 1980's, with the popularization of digital technology, digital sound processors started to appear. In these devices, however, the effect is not a consequence of the physical behavior of the circuit, but a result of the program being run by the digital processor. In this sense, the bonding between the hardware and the effect had ceased to exist.

Also due to the flexibility of digital technology, multi-effects units were created. This type of device offers a selection of effects to be chosen by the musician and can process some of them at the same time.

Figure 3:
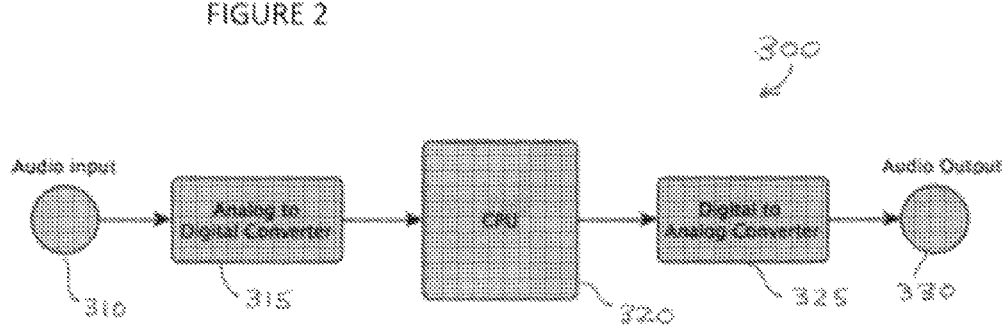
FIG. 3 illustrates a conventional digital audio processor configuration.

With reference now to FIG. 3 of the DRAWINGS, there is illustrated therein a basic digital audio processor, generally designated by the reference numeral 300, where the signals entering an audio input 310, are fed into an analog-to-digital converter, generally designated by the reference numeral 315, which preferably contains a digital converter, a chip that encodes the analog audio signal into a digital bit stream, preferably one pursuant to the protocols of pulse-code modulation (PCM).

The PCM signal is passed to a CPU, generally designated by the reference numeral 320, which is preferably loaded with software that, as with the analog circuit of the previous example, alters the signal in a desired way. This alteration or modification is called a "digital effect," and can be a simulation of the aforementioned effects of analog circuits, such as for nostalgia, or even pure digital signal manipulations.

With reference again to FIG. 3, once the signal is processed by the CPU 320, it is fed into a digital-to-analog converter, generally designated by the reference numeral 325, such as via a chip that decodes the digital bit stream back to an analog signal, which is then fed to an output 330.

It should be understood that the CPU 320 can have the software therein "hard coded" in the form of firmware, or it can have an Operating System loaded in memory and all signal processing software is loaded by the OS. As is understood in the art, the first scenario is often the case of single purpose devices, which are based on specific DSP (Digital signal processing) chips. As is further understood in the art, the second option is based on general purpose microprocessors that are able to load an OS and are found on PCs, tablets and smartphones.

Figure 4:
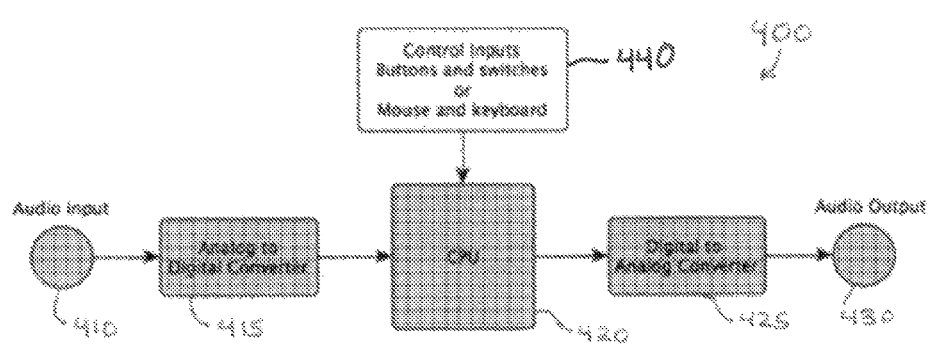
FIG. 4 illustrates an improvement to the digital audio processor configuration as shown in FIG. 3, which includes some controls.

With reference now to FIG. 4 of the DRAWINGS, there is illustrated therein a controllable digital audio processor, generally designated by the reference numeral 400, where the signals entering an audio input 410, are fed into an analog-to-digital converter, generally designated by the reference numeral 415. As with the aforedescribed analog counterpart shown in FIG. 2, the digital audio processor 400 also features means of adjusting the effects parameters, be it by means of buttons and switches, which is the preferred option in single purpose devices, and by means of mouse and keyboard clicks, which is the case of general processing devices (PCs).

As noted, personal computers evolved in parallel to the evolution of effects processors. The aforementioned digital signal from the converter 415 enters a CPU, generally designated by the reference numeral 420, where control inputs, generally designated by the reference numeral 440, act thereon, as described. In this instance, the control inputs can include a variety of means, such as buttons and switches, as well as mouse and keyboard, as described in hereinabove and in more detail hereinbelow. The modified inputs are then re-converted, from digital to analog, by a converter 425, and output to an output device 430.

Figure 5:
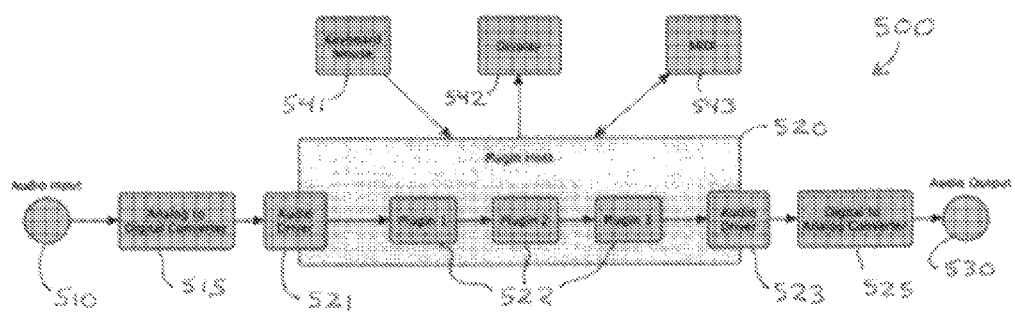
FIG. 5 illustrates an improvement to the digital audio processor configuration as shown in FIG. 4, which includes some plugins according to the teachings of the present invention.

With reference now to FIG. 5 of the DRAWINGS, there is illustrated therein a controllable digital audio processor, generally designated by the reference numeral 500, where the signals entering an audio input 510, are fed into an analog-to-digital converter, generally designated by the reference numeral 515, and then the signals pass to a plugin host, generally designated by the reference numeral 520. As shown, the plugin host 520 has an audio driver 521, which feeds the signal through a number of plugins, generally designated by the reference numeral 522 (and corresponding to various control inputs), after which the signal feeds to a second audio driver 523, to a digital-to-analog converter 525 and then to an audio output 530.

To make the development of effects simpler, such as in connection with the paradigm shown in FIG. 5, plug-in standards have been created. A plugin is a block of code designed to be "plugged" into a pre-defined structure. This architecture permits the developer to focus on the audio processing, without the need to worry about connections, drivers, etc. The software that manages the plugins is the aforementioned plugin host 520, and, as shown, it is the plugin host 520 that "connects" the plugin's inputs and outputs.

Indeed, the host paradigm, as exemplified in FIG. 5, commonly has a graphical user interface by means of which the user sets and monitors the values of the various plugin controls, for example, using a keyboard and/or a mouse, generally designated by the reference numeral 541, and displayed on a display 542. It should be understood that the kind of architecture shown in FIG. 5 is mainly used in PCs, and several plugin standards have been released since digital audio reached the PCs. Also, if Musical Instrument Digital Interface (MIDI), generally designated by the reference numeral 543, is supported, incoming and outgoing MIDI messages are exchanged by the host. It should be understood that the Musical Instrument Digital Interface 543 is a technical standard that describes a protocol, digital interface and connectors, which allows a wide variety of electronic musical instruments, computers and other related devices to connect and communicate with one another.

Today the PC is, in theory, a viable solution for live audio processing. It possesses the processing power, the peripherals (Audio and MIDI interfaces) and the software foundation in order to do it. The single biggest disadvantage of using the PC, however, is that it is not meant for live performance. Indeed, PCs are unable to withstand the harsh environments and situations that musical equipment faces. Also, the Graphical User Interface (GUI) and human-machine interface (HMI) devices are not meant for live playing, such as displays 542, mouse and keyboard 541, and other peripherals.

In a presently-preferred embodiment, the present invention adopts an audio processing solution based on general purpose microprocessors—in particular the so-called ARM platform, a RISC-based instruction set architecture with a Linux kernel with the RT patch and the aforementioned LV2 plugin standard.

As noted, the devices, systems and methods for foot-based effects have a variety of problems, which are surpassed pursuant to the teachings of the instant invention. Some of the advantages of the present invention over the prior art include: (1) remote configuration is now possible via any web-enabled device (PC, tablet, mobile); (2) platform mixture of digital and analog audio processing is possible; (3) the free arrangement of plugins inside the digital section can run at the same time; (4) free addressing of plugin controls possible; (5) the possibility to extend the physical controls and port metadata; (6) seamless "drag and drop" system for plugin management, such as from Cloud to Device; (7) true general purpose audio processor—any electric signal and any plugin; and (8) the union of MIDI and Audio processing in a single device.

From a technical point of view the current trend has been to include features from general computing devices into single-purpose ones, where classic multi effects, firmware upgrades and VST hardware machines well illustrate this trend.

The present invention, however, moves in the exact opposite direction, adding single-purpose devices characteristics and behaviors to general computing ones, yet retaining all the possible flexibility for real time operation.

Figure 6:
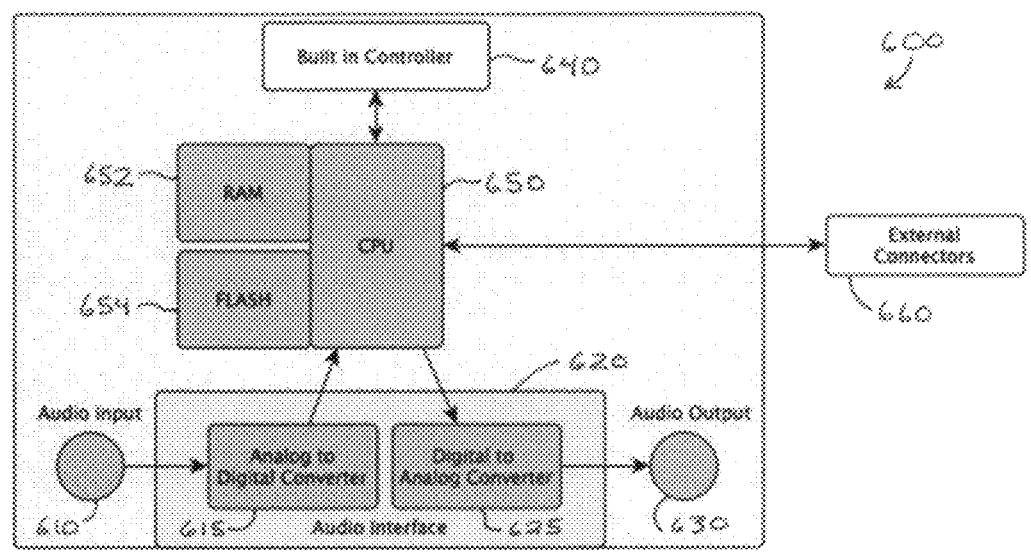
FIG. 6 illustrates a workflow representation for digital audio processor configurations, as shown in FIGS. 4 and 5, which includes some basic logic structures according to the teachings of the present invention.

With reference now to FIG. 6 of the DRAWINGS, there is illustrated therein an exemplary logic structure for a controllable digital audio processor, generally designated by the reference numeral 600, pursuant to the teachings of the present invention, where the signals entering an audio input 610, are fed into an audio interface, generally designated by the reference numeral 620, which includes an analog-to-digital converter, generally designated by the reference numeral 615. As shown, the audio interface forwards the audio signals to a CPU, generally designated by the reference numeral 650, which processes it, and sends it back to the audio interface 620, particularly a digital-to-analog converter 625, which sends the audio to an audio output 630.

As further shown in FIG. 6, controls for the plugins, i.e., parameter settings, as fed to the CPU 650 from a built-in controller, generally designated by the reference numeral 640 or by external controllers, generally designated by the reference numeral 660. It should be understood that all of the instructions or programs run by the CPU 650 are stored in non-volatile memory, such as FLASH, generally designated by the reference numeral 654, which are located into RAM 652.

Figure 7:
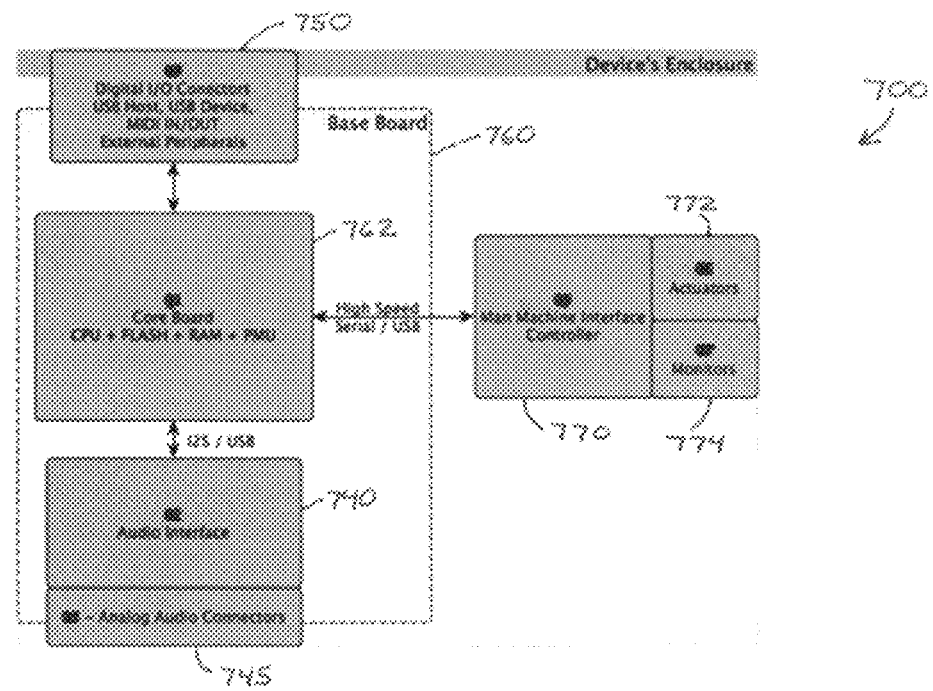
FIG. 7 illustrates a model representation for hardware structures that may be employed in the digital audio processor configurations as shown in FIGS. 4-6, according to the teachings of the present invention.

With reference now to FIG. 7 of the DRAWINGS, there is illustrated therein an exemplary hardware structure for a controllable digital audio processor, generally designated by the reference numeral 700, pursuant to the teachings of the present invention, particularly the paradigm shown and described in connection with FIG. 6.

As shown in FIG. 7, a core board, generally designated by the reference numeral 762, contains all digital processing elements isolated in a single board, including a CPU, volatile or Random Access Memory, non-volatile or FLASH Memory, Power Management Unit (PMU) for managing the energy for all elements of the core board 762.

The core board 762 is preferably a computer with all connection made by pin headers. It is preferably capable of running a Linux Operating System and contains physical pins to connect to all elements of the device, such as USB, Serial lines, I2S, power, etc. The RAM is necessary for the CPU to perform the necessary calculations, but is volatile and does not retain information when the device is turned off. The FLASH, nonvolatile memory, is where all information—plugins, assemblies, configurations and the OS itself—is stored between utilizations. Just as in a regular computer, the OS is loaded from FLASH to RAM in order to run.

A base board, generally designated by the reference numeral 760, receives the aforementioned core board 762, and contains all necessary connections—to an MMI 770, with connections to actuators 772 and monitors 774, USB ports, MIDI ports, DC power and to other components and external devices.

The core board 762 is preferably engineered in a way that it connects to the base board 760 by means of pin headers. In this way, it is possible to remove it and makes future upgrades possible.

In the presently-described embodiment, the base board 760 contains an audio interface 740 and Digital I/O connections 750, but it should be understood that those could alternatively be in external boards. A main function of the base board 760 is to route all necessary signals to the core board 762 for processing.

The aforementioned audio interface 740 includes two sections: for analog and for digital. The analog section is responsible for bridging the audio source's electric signal that is connected to an analog audio connector, generally designated by the reference numeral 745, to an analog-to-digital converter-required electrical signal. The present invention preferably accepts three main families of analog audio—Line, Mic and Hi-Z—and the selection between them is done by the user and accomplished by means of a general purpose input/output (GPIO) from the aforementioned CPU, which switches the desired circuit.

With reference again to FIG. 7, the aforementioned digital I/O connectors 750 have various external connections, including MIDI in and out—receive and send MIDI data to the CPU in order to be used by the plugins. Both musical information—MIDI notes—as controlling information—MIDI control—can be sent through these connectors.

An additional external connector for the digital I/O connectors 750 include a USB Host—this is a fully capable USB host port offered by the CPU. As is understood in the art, many USB devices can be plugged into this port, including: a Wi-Fi adapter to connect to a Wi-Fi network, a Bluetooth adapter to establish a PAN (Personal Area Network) with other Bluetooth devices, MIDI-USB devices—same as traditional MIDI, but via USB, and mass storage devices—to be used by the OS to load or store data.

A further external connector for the digital I/O connectors 750 include USB Device—this is a port to connect the invention to computers or other devices that feature a USB Host port. With this connection, the present invention is able to offer: an Ethernet-over-USB connection, a USB class compliant Digital Audio interface, and a Mass Storage Device in order for PCs to have direct access to the file system.

Additional external connectors for the digital I/O connectors 750 include External Peripherals—this is a high speed serial port—RS-422—connected using an RJ-45 Jack paradigm, which permits "daisy chain" architecture. The present invention preferably uses a protocol called Control Chain, developed in house, to connect external peripherals and energize them through the serial line itself. Because of the RJ-45 adoption, the Control Chain has also the advantage of using the common network cables, available virtually anywhere in any size.

With reference again to FIG. 7, particularly the Man Machine Interface controller 770, built-in controller. This is the controller by which the user controls the aspects of the present invention. In this particular embodiment, for example, the MMI 770 is located in a board external to the base board 760, but it should, of course, be understood that the MMI 770 could be in the same printed circuit board (PCB), just as the audio interface 740. The MMI 770 is where various direct interactions with the present invention are made, including loading and unloading plugin arrangements, controlling plugin parameters, and configuring functions of the device. Further, the MMI 770 is preferably comprised of a board with its own processor—such as an ARM Cortex M3 in this particular case—a set of actuators 772, such as knobs and footswitches, and a set of monitors 774, such as LCD displays and LEDs, as is understood in the art.

Figure 8:
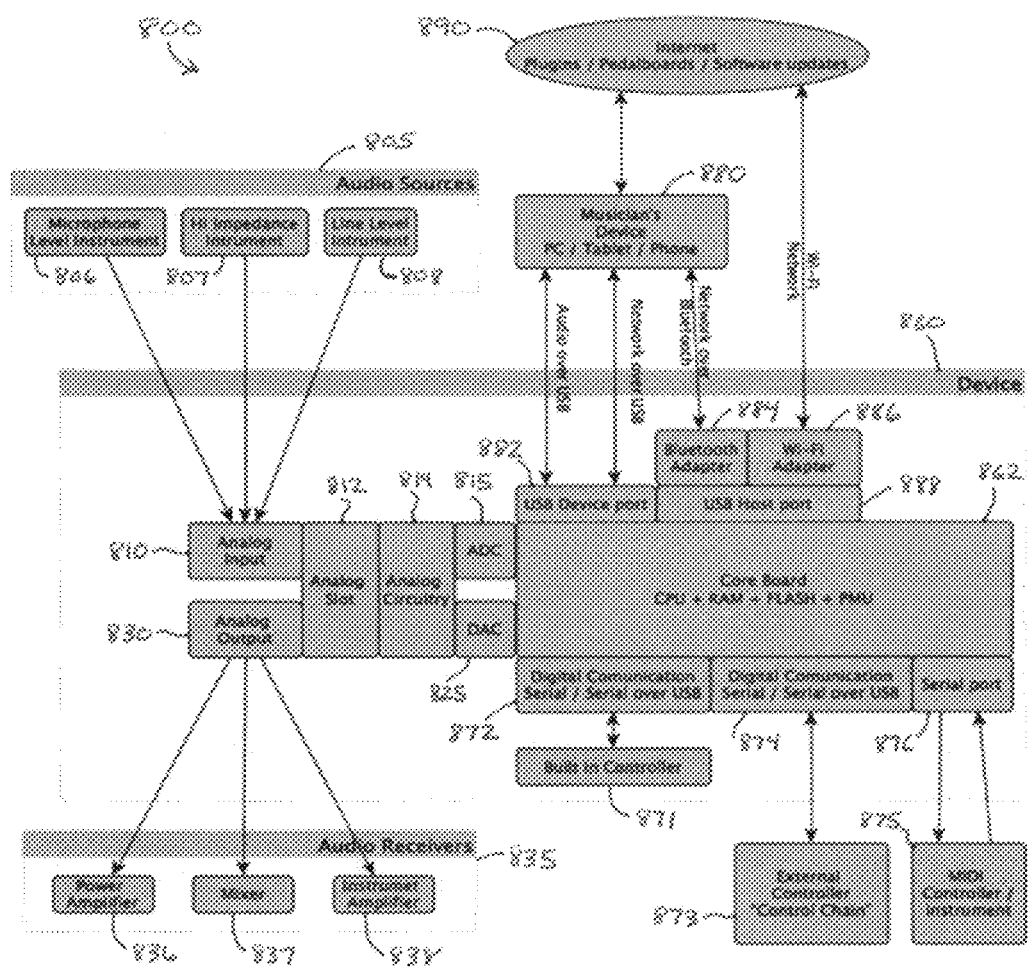
FIG. 8 illustrates a more detailed model representation for hardware structures that may be employed in the digital audio processor configurations as shown in FIG. 7, which may be employed in practicing the principles of the present invention.

With reference now to FIG. 8 of the DRAWINGS, there is illustrated therein an exemplary hardware structure for a controllable digital audio processor, generally designated by the reference numeral 800, pursuant to the teachings of the present invention, which build upon the embodiment illustrated and described in connection with FIG. 7 and the paradigm shown and described in connection with FIG. 6.

As shown in FIG. 8, base board 860 has a variety of components thereon, including core board 862, which includes the CPU, RAM, FLASH, PMU and other components as described hereinabove.

Audio sources, generally designated by the reference numeral 805, include microphones and microphone level instruments 806, Hi impedance instruments 807, line level instruments 808, and other source instrumentation as is understood in the art. These source signals feed into an audio input, generally designated by the reference numeral 810, pass through an analog slot, generally designated by the reference numeral 812 and analog circuitry, generally designated by the reference numeral 814, before passing through an analog-to-digital converter 815 to the core board 862 for processing.

As discussed, during the processing, the input audio signals may be manipulated, distorted, delayed or otherwise changed through various controllers. For example, and as described further herein, a musician's device, generally designated by the reference numeral 880, in this embodiment of the present invention can include a PC, tablet, smart phone or other such device whereby the musician can modify the signals. As shown in FIG. 8, the musician can access the Internet, generally designated by the reference numeral 890, for additional software to accomplish this, such as drivers, plugins, pedalboards and software updates.

The musician can then forward the changes to the aforementioned core board 862 with the CPU thereon via USB connections, whether audio over USB or network over USB, to a USB device port, generally designated by the reference numeral 882, connected to the core board 862. Alternatively, the musician can forward the changes from the device 880, wirelessly over a network over Bluetooth protocol, to a Bluetooth adaptor, generally designated by the reference numeral 884, which is connected to another USB host port, generally designated by the reference numeral 888. Furthermore, the changes can also be sent from the Internet 890, such as over a Wi-Fi network, to a Wi-Fi adaptor, generally designated by the reference numeral 886, which is also connected to the aforesaid USB host port 888, which, in turn, is connected to the core board 862.

With further reference to FIG. 8, there are shown a variety of additional controllers for manipulating the audio signals in the processor. For example, a built-in controller, generally designated by the reference numeral 871, connects to the aforementioned core board 862 via a so-called digital communication serial/serial over USB port, generally designated by the reference numeral 872. Similarly, an external controller or "control chain," generally designated by the reference numeral 873, connects to the core board 862 via a digital communication serial/serial over USB port, generally designated by the reference numeral 874. Likewise, a MIDI controller or instrument, generally designated by the reference numeral 875, also connects to the core board 862 via a serial port, generally designated by the reference numeral 876.

As discussed, the musician, through the various controllers, manipulated by foot movements, modifies the audio signals. The so-modified audio signals then pass through a digital-to-analog converter, generally designated by the reference numeral 825, through the aforesaid analog circuitry 814 and analog slot 812 to an analog output, generally designated by the reference numeral 830, which then pass to audio receivers, generally designated by the reference numeral 835. As shown, the audio receivers include power amplifiers 836, mixers 837 and instruments amplifiers 838. It should, of course, be understood that additional and alternate instrumentations may also be employed.

Figure 9:
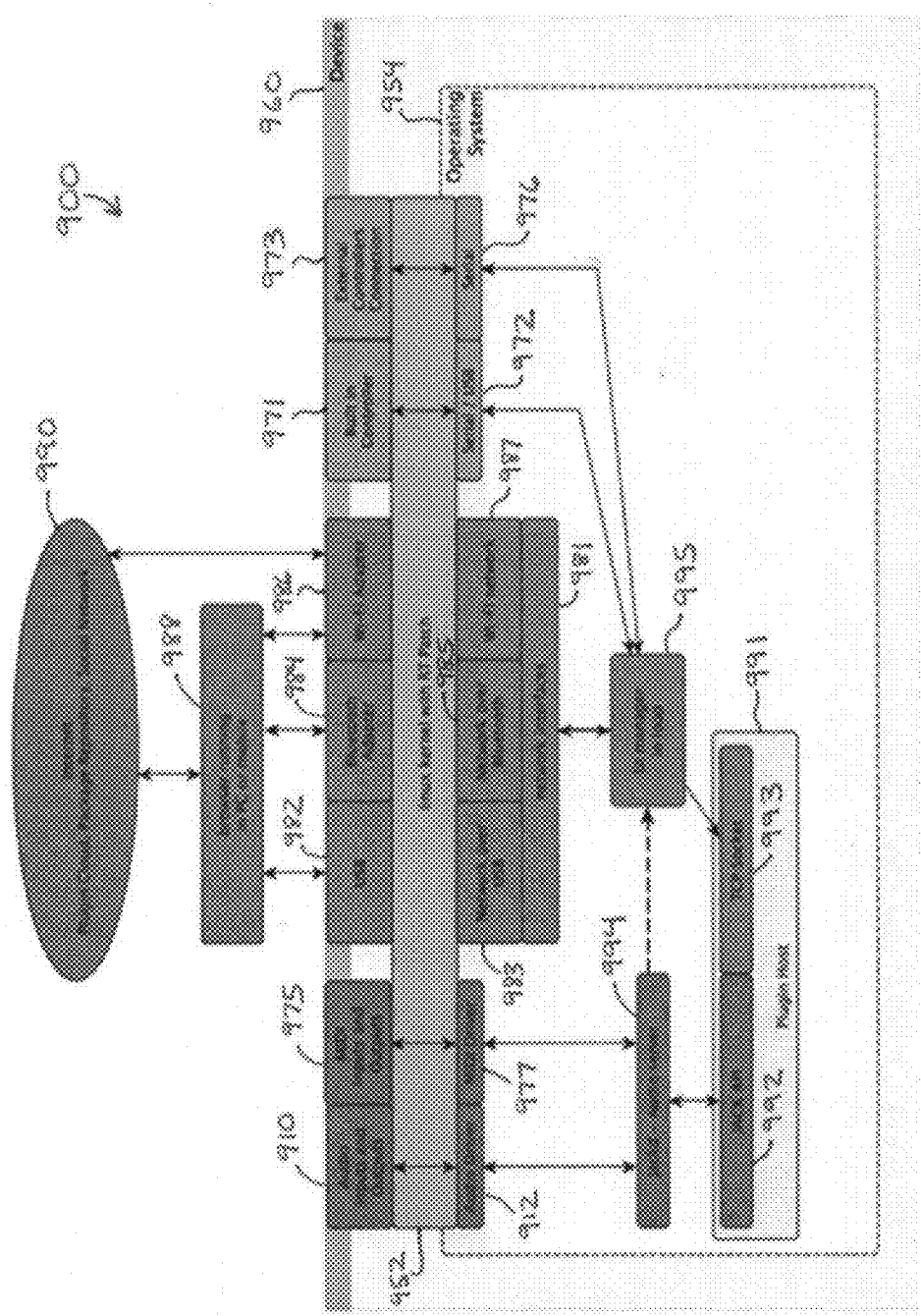
FIG. 9 illustrates a model representation for software structures that may be employed in the digital audio processor configurations as shown in FIGS. 4-8, according to the teachings of the present invention.

With reference now to FIG. 9 of the DRAWINGS, there is illustrated an exemplary software implementation of the present invention, generally designated by the reference numeral 900, such as employing the various hardware components set forth and described in connection with FIG. 8.

In order to be a general purpose device onto which users install programs according to their need, the device software runs on an Operating System that is embedded in it. A preferred and exemplary platform for the implementation of the instant invention is Linux because Linux may be ported to many hardware architectures (Intel x86, AMD 64, PowerPC, ARM et al.), the kernel can be patched to meet Real Time (RT) constraints, there is an existing community of audio, which means that there is a lot of code already developed, and there is the possibility to develop plugins using regular personal computer. Further, there is no need for a special development kit.

In a preferred embodiment, the operating system governing the device, generally designated by the reference numeral 954, is based on an RT Patched Linux kernel, details for which are available at www.kernel.org and www.kernel.org/pub/linux/kernel/projects/rt/, incorporated herein by reference. The kernel, generally designated by the reference numeral 952, is the software element that makes the bridge between the software and the hardware, providing the Hardware Abstraction Layer (HAL). With reference to FIG. 9, the items over the kernel represent the hardware, and the items under the kernel represent the software, where each hardware is translated to a software element my means of the specific driver, as is understood in the art.

With the RT patch, all hardware interrupts become preemptible treads, making it possible to prioritize, in terms of CPU time, certain devices on behalf of others. In the present invention, the audio interface is configured to be on the top priority in order to permit live audio processing with no audible glitches, which is a leap over the prior art devices.

As shown in FIG. 9, the hardware or base board 960, all above the kernel 952, include audio inputs and outputs, generally designated by the reference numeral 910, and MIDI inputs and outputs, generally designated by the reference numeral 975. The Internet, generally designated by the reference numeral 990, including Plugin Clouds, Package Repositories and Social Networks, is connected to a browser, generally designated by the reference numeral 988, which runs on the aforementioned PC, mobile or smart phone, and connect to the kernel 952 via various connectors and adaptors, such as USB 982, Bluetooth 984, and Wi-Fi 986. Additional hardware includes built-in controllers, generally designated by the reference numeral 971 and external controller connections, generally designated by the reference numeral 973.

On the software side, audio drivers and MIDI drivers, generally designated by the reference numerals 912 and 977, respectively, connect, for example, to an audio server, generally designated by the reference numeral 994, which, in turn, connects to an application program interface (API), generally designated by the reference numeral 992, such as one based on an open source software application called JACK, details for which are set forth at www.jackaudio.org, incorporated herein by reference. API 992 is part of Plugin Host 991, which also includes a TCP socket, generally designated by the reference numeral 993. As shown the audio server 994 communicates with a User Interface Manager, generally designated by the reference numeral 995, which communicates with the TCP socket 993. As discussed, the Plugin Host 991 is preferably based on the aforementioned Linux Audio Developer's Simple Plugin, version 2, or LADSPA 2, or LV2 protocol.

With further reference to FIG. 9, there are various network interfaces, generally designated by the reference numeral 981, including network over USB, generally designated by the reference numeral 983, network over Bluetooth, generally designated by the reference numeral 985, and Wi-Fi networks, generally designated by the reference numeral 987. As shown, the network interfaces 981 communicate with the aforementioned UI manager 995. Likewise, Serial/USB drivers or applications, generally designated by the reference numerals 972 and 976, also communicate with the UI manager 995.

Figure 10:
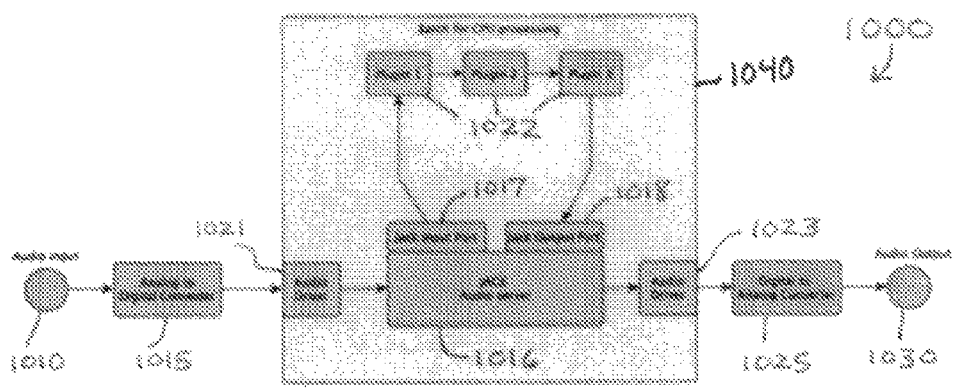
FIG. 10 illustrates a model representation for software structures that may be employed in the digital audio processor configurations as shown in FIGS. 4-9, particularly plugin configurations according to the principles of the present invention.

With reference now to FIG. 10 of the DRAWINGS, there is shown a representation for an open source protocol for JACK, generally designated by the reference numeral 1000, which may be employed in practicing the principles and teachings of the present invention in various embodiments. As shown, audio inputs 1010 pass through an analog-to-digital converter 1015 and then to CPU batch processing, generally designated by the reference numeral 1040. An audio driver 1021 receives the now digitized audio inputs, which are passed to an audio server, generally designated by the reference numeral 1016, which, as discussed, may be based on the JACK open source protocol, which is for audio and MIDI connectivities.

As shown in FIG. 10, the audio inputs pass to an input port, generally designated by the reference numeral 1017, and then to a series of plugins or batches, generally designated by the reference numeral 1022, which hold the items for processing by the CPU, after which the signals are fed back, i.e., after which the signals pass to an audio output port, generally designated by the reference numeral 1018, and back to the server 1016. The signals then pass through an audio driver 1023, through a digital-to-analog converter 1025, and then to an audio output 1030.

Figure 11:
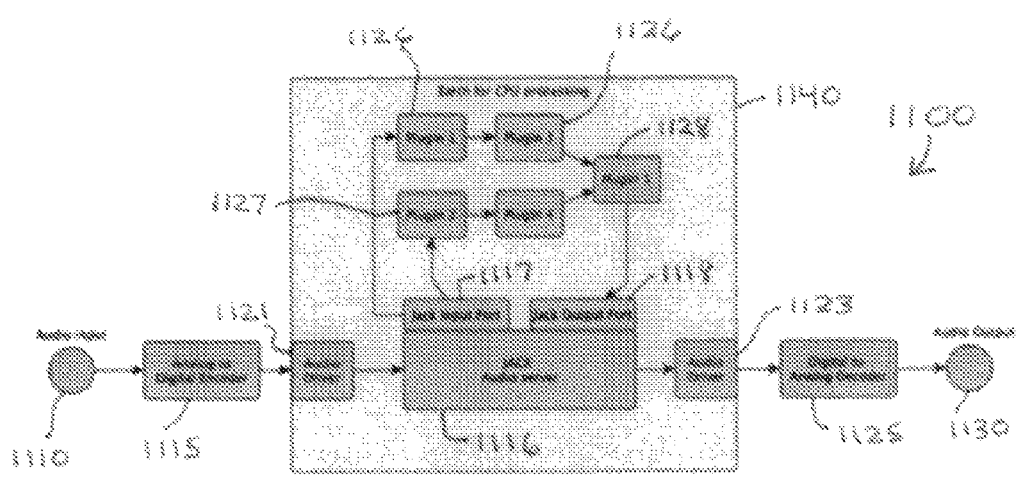
FIG. 11 illustrates a model representation for software structures that may be employed in the digital audio processor configurations as shown in FIG. 10 in an alternate embodiment, according to the teachings of the present invention.

As shown in FIG. 10, the plugins 1022 can be arranged serially. However, the JACK protocol allows a variety of arrangements for the plugins, which can form a graph between the input and output, for batching, generally designated by the reference numeral 1140. For example, with reference now to FIG. 11 of the DRAWINGS, there is shown a representation where the aforementioned plugins are arranged for batching and processing differently, generally designated by the reference numeral 1100. For example, after the audio input 1110, ADC 1115, audio driver 1121, audio server 1116 and input port 1117, the inputs are configured to pass to two serially-connected group of plugins, generally designated by the reference numerals 1126 and 1127, respectively, both of which then pass to a terminal plugin, generally designated by the reference numeral 1128, which feeds to the output port 1118, server 1116, audio driver 1123, DAC 1125, and then to an audio output 1130.

It should, therefore, be understood that the aforementioned batching configurations can be implemented in a variety of ways to accomplish a variety of effects. The dynamic flexibility of the present invention in this regard readily distinguishes the innovation set forth herein from the prior art.

Regarding networking, one of the main differences of the present invention over the prior art is the adoption of a network structure, as illustrated and described in FIG. 9, particularly the central portion thereof. From the Internet 990, at the top, to the plugin host 991, at the bottom, all communication is preferably done via TCP-IP. Using this structure generates a variety of benefits, such as the same data flowing from the Internet 990 to the plugin host 991. Indeed, these connections can be easily stablished via multiple mediums, as shown and described hereinabove, including Network-over-USB, Wi-Fi and Bluetooth Personal Area Network, where three options cover virtually all possible devices (PCs, netbooks, tablets, mobile phones). Additional benefits are that the networks are architecture agnostic (IBM PC, Apple MAC, iOS, Android), and, since the network structure is completely stablished within the consumer market, the software components need only to rely on the network abstraction and no specific software in needed from platform to platform.

Regarding the User Interface Manager 995, which was developed and designed by the Applicant herein, the aforesaid UI manager is preferably a Python-based webserver that contains an I/O loop inside a core. The UI manager 995 preferably handles all non-audio information. In operation, the webserver serves a page, which is a Graphical User Interface entirely designed following World Wide Web Consortium (W3C) standards—HTML and Cascading Style Sheets (CSS). All data from the internal and external controllers, as well as from the musician's browser (Graphical User Interface), is handled by the asynchronous I/O loop inside the UI manager 995. Once the user has a physical connection between his Personal Device (such as a PC, phone, tablet) and the UI manager 995 and other aspects of the instant invention (USB, Bluetooth, Wi-Fi), and it has stablished a network connection to the present invention, the user is then able to call that page from any browser, just like a website that in reality is a remote interface for their device.

Regarding the aforementioned plugin host 991, which is preferably based on LV2, the developed host is controlled by a socket 993, and thus, can be controlled remotely in a TCP-IP network. It receives all user commands from the UI manager 995 through the aforementioned socket 993 and interfaces with JACK.

As discussed, in operation, the majority of devices performing the audio processing functions are single purpose devices. Once the software is detached from the hardware, and the possibility of changing the software arises, and thus the function of the device, indeed a new moment in the use of the device appears: the configuring moment. This is the moment when the user accesses a given interface in order to install/remove elements, arrange them, manage arrangements and so forth. In today's time of the Internet, this is also the moment when software upgrades are done.

In connection with the present invention, the creation of dedicated hardware interface (more screens and buttons) onto the device itself would pose a problem. Due to openness, freedom and flexibility, the interface would get rather complicated, and two equally bad options would have to be chosen. In order to offer a rich experience, there would be required more buttons, screens, etc., but this would make the device complex, expensive and less robust. Another approach would be to keep the experience poor, but that too is not a good option.

The solution, as set forth in the instant invention, is to offer a connection to external devices through which the configuration is made. Nowadays, PCs and related devices—tablets and mobile phones—are very common, and is very unlikely that a person does not have access to one of them. Indeed, these devices provide high resolution displays, Internet connection, pointing devices, and so forth, making the configuration of the present invention not just possible, but rich and full of possibilities.

The option to use multiple devices for configuration, however, has some drawbacks. Multiple options require multiple hardware connections and multiple interfacing software. The development and maintenance of such a variety of elements would be highly impractical.

The present invention uses a different approach, making use of the network abstraction and thus taking advantage of the following facts: (1) that every modern gadget is network capable, and all needed software is already made by the gadget's manufacturer, (2) that the network service and structure is embedded (abstracted) in most hardware mediums, and (3) that the web language is universal and platform agnostic.

With the above in mind, on the hardware side, in a preferred embodiment, the present invention adopted various connections based on USB, which is the most common hardware connection and found in the majority of PCs. The USB structure has a topology that differentiates the two edges of the connection, one being the host and the other the device. PCs are always hosts. Tablets and Mobile phones can sometimes be hosts and sometimes devices. When plugged to PCs, the tablets and mobiles (as well as other such equipment) they are devices. The USB hardware makes this differentiation on the cables and jacks, having a jack for hosts, called USB-A, and some jacks for the devices, called USB-B and USB-mini-B. As some gadgets, like the mobile phones or the tablets, are becoming computers themselves, USB has a new port called OTG—on the go—which can be a device or a host depending on the connection made at the other end of the cable.

Regarding the USB-Host protocol, Wi-Fi adapters can be connected. With the Wi-Fi adaptor, the present invention, as shown hereinabove, is capable of directly connecting to a Wi-Fi network. It should also be understood that Bluetooth adapters can be connected. The Bluetooth protocol features a network service so that two Bluetooth devices can create a PAN—personal area network—between them to exchange information. Lastly, tablets or mobile devices can be connected on this port, which include the USB-network service (along with the Personal Router service).

Regarding the USB-Device protocol, connection is made directly to the PC and offer the USB-network service, thus creating a virtual network interface in the PC's OS.

It should, therefore, be understood that once any of the aforementioned connections is made, a network structure is built on top and, from this point on, the present invention and the controller device preferably connect to each other using a TCP-IP network topology.

Indeed, employing the principles of the present invention, many effects can be pre-arranged and stored in the foot-operated device for deployment later during a concert or performance. As discussed, the interplay or interface of the effects can be deployed to various physical controllers, such as knobs, footswitches, expression pedals and others countless peripherals, all of which can be connected to and accessible from the instant invention. Further, many instruments can be used with MOD at the same time, e.g., with two P10/XLR inputs and one MIDI input, one can connect up to three different instruments in the instant invention simultaneously, each one using its own effect chain, as described, and each of which being configured and connected in unique ways. A further advantage of the instant invention is that the principles herein are adaptable to almost any instrument, including guitars, violins, basses, flutes, trumpets, microphones, keyboards, MP3 players, and other instruments and sound devices.

As mentioned hereinabove, the present invention features a web server or UI manager 995 that routes all non audio data by means of an asynchronous I/O loop. This web server listens to all possible network ports (Bluetooth, Wi-Fi, USB-network, etc.) and serves a "page" that is the configuring interface, as illustrated and described in connection with FIG. 12 et al. hereinbelow.

Given that the configuring device has an internet connection available, the browser in which the configuration page is loaded makes the bridge between the Internet and the invention.

With this remote GUI the user is able to install plugins, assemble arrangements of plugins and connect them, adjust the parameters of plugins on screen, address parameters to the hardware controllers, save plugin arrangements (pedalboards) on the device itself (Flash memory), organize the arrangements in banks for live playing, share the pedalboards in the social networks, and browse pedalboards from the social networks and try them locally.

Figure 12:
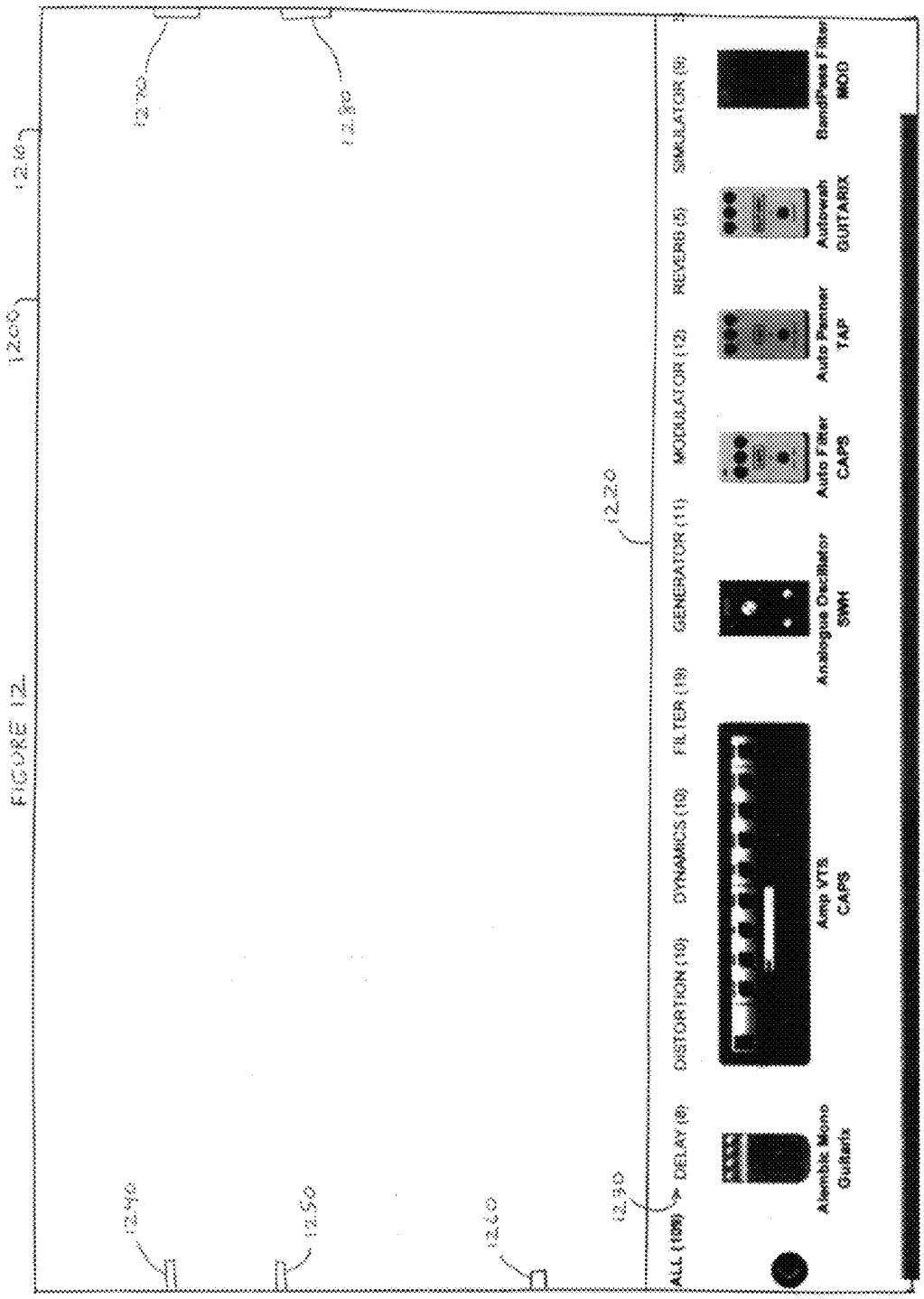
FIG. 12 illustrates a graphical user interface upon which effects can be modeled.

With reference now to FIG. 12 of the DRAWINGS, there is illustrated a computer screen, such as may be displayed on a PC, tablet or mobile phone device, as described hereinabove, upon which pedalboards may be modeled, tested and effects created, designated generally by the reference numeral 1200. A working screen 1210 is also shown within which the modeling will be conducted. At the bottom is a selection panel, generally designated by the reference numeral 1220, within which are representational icons of various effects. As shown, the panel 1220 has an upper row, generally designated by the reference numeral 1230 that lists the types and numbers of types of effects, such as delay, distortion and so forth, along with the number of each available, only a portion of which are shown. Representative icons are also shown in the panel 1220. It should be understood that with a mouse or other navigation tool the full range of icon selections can be shown.

It should also be understood that with a mouse or other selector means, one or more of the icons shown or available in the panel 1220 (or downloadable from external sources) may be selected and copied to the working screen 1210. As discussed, the audio effects creators may select any of a wide range of effects, each represented by respective icons. With reference again to FIG. 12, there are shown representative inputs and outputs, for example, to the left of the figure, there are two hardware audio inputs, generally designated by the reference numerals 1240 and 1250, respectively, along with a hardware MIDI input, generally designated by the reference numeral 1260. To the right of the figure, there are two hardware audio outputs, generally designated by the reference numerals 1270 and 1280, respectively. It should be understood that these inputs and outputs represent and mimic the various signals involved. For example, a musician desirous to create a new effect, may attach a guitar or other instrument to the aforesaid inputs, manipulate the signals as discussed hereinabove, and then output the signals, for example, to a storage device or memory or the Cloud, as is understood in the art.

Figure 13:
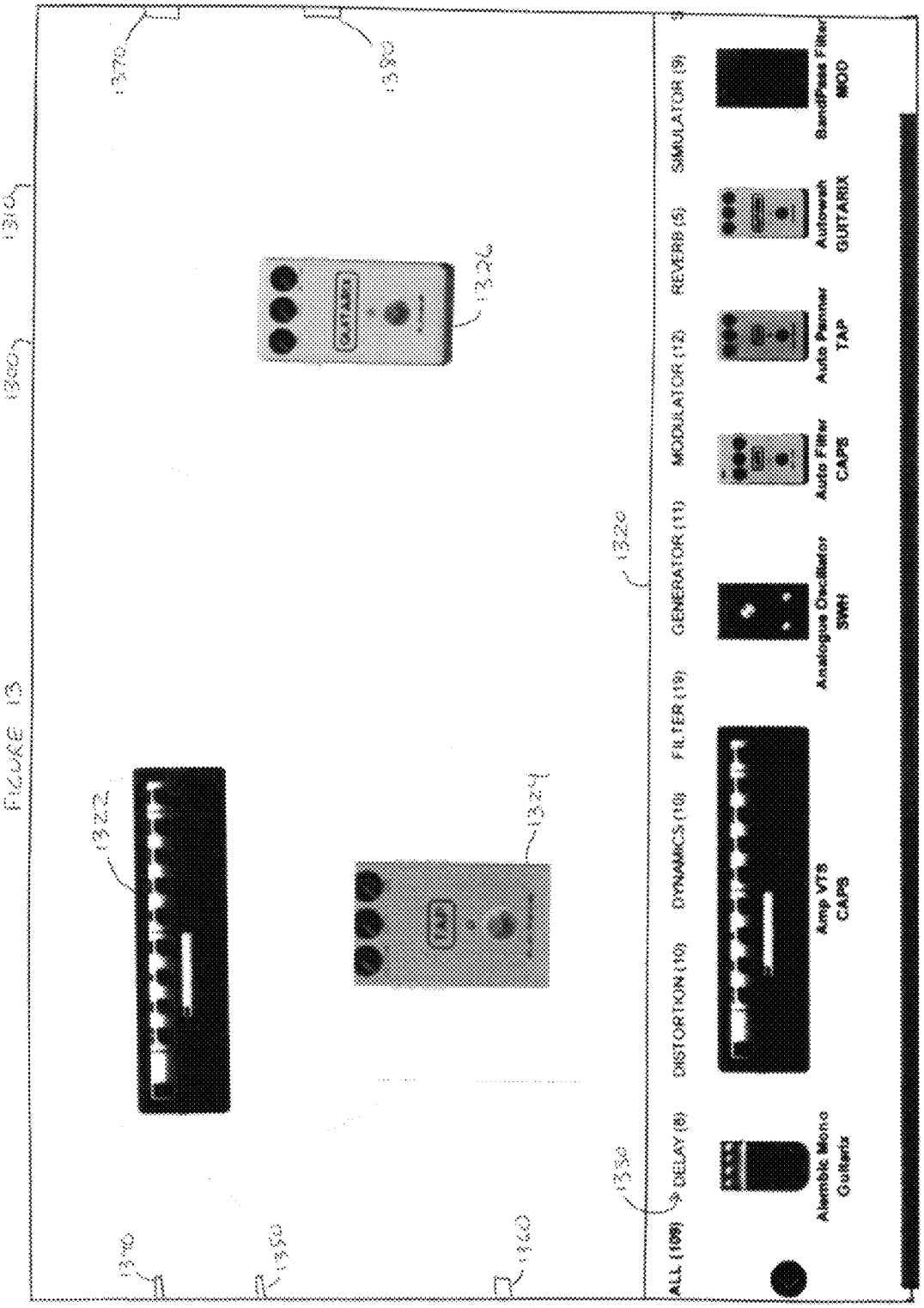
FIG. 13 illustrates the graphical user interface shown in FIG. 12, with icons of effects components.

With reference now to FIG. 13 of the DRAWINGS, there is illustrated the aforedescribed computer screen, as illustrated and described hereinabove in connection with FIG. 12, designated generally by the reference numeral 1300, within which particular icons are copied to working screen 1310. At the bottom is a selection panel, generally designated by the reference numeral 1320, within which are representational icons of various effects, as also discussed hereinabove in connection with FIG. 12. As shown, the panel 1320 has an upper row, generally designated by the reference numeral 1330 that lists the types and numbers of types of effects, such as delay, distortion and so forth, along with the number of each available, only a portion of which are shown. Representative icons are also shown in the panel 1320. It should be understood that with a mouse or other navigation tool the full range of icon selections can be shown. With reference again to FIG. 13, there are shown representative inputs and outputs, for example, to the left of the figure, there are two hardware audio inputs, generally designated by the reference numerals 1340 and 1350, respectively, along with a hardware MIDI input, generally designated by the reference numeral 1360. To the right of the figure, there are two hardware audio outputs, generally designated by the reference numerals 1370 and 1380, respectively. As shown, a CAPS icon, generally designated by the reference numeral 1322, a TAP icon, generally designated by the reference numeral 1324, and a Guitarix icon, generally designated by the reference numeral 1326 are positioned by the user in preparation for the desired effect.

Figure 14:
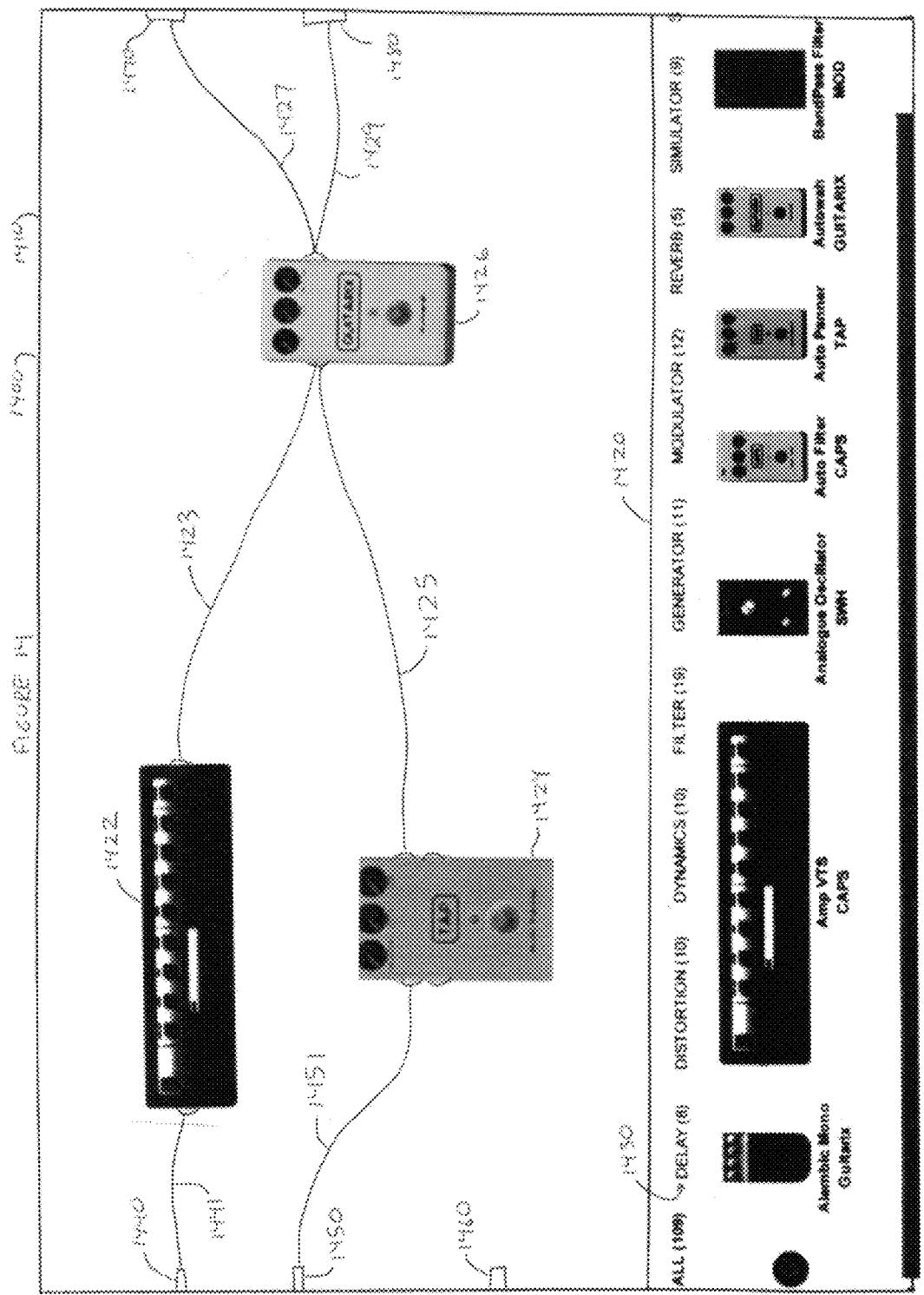
FIG. 14 illustrates the graphical user interface shown in FIG. 13, with connections between the icons of effects components shown.

With reference now to FIG. 14 of the DRAWINGS, there is illustrated the aforedescribed computer screen, as illustrated and described hereinabove in connection with FIGS. 1 and 132, designated generally by the reference numeral 1400, within which the particular icons copied to a working screen 1410, are configured. At the bottom is a selection panel, generally designated by the reference numeral 1420, within which are representational icons of various effects, as also discussed hereinabove in connection with FIGS. 12 and 13. As shown, the panel 1420 has an upper row, generally designated by the reference numeral 1430 that lists the types and numbers of types of effects, such as delay, distortion and so forth, along with the number of each available, only a portion of which are shown. Representative icons are also shown in the panel 1420. It should be understood that with a mouse or other navigation tool the full range of icon selections can be shown. With reference again to FIG. 14, there are shown representative inputs and outputs, for example, to the left of the figure, there are two hardware audio inputs, generally designated by the reference numerals 1440 and 1450, respectively, along with a hardware MIDI input, generally designated by the reference numeral 1460. To the right of the figure, there are two hardware audio outputs, generally designated by the reference numerals 1470 and 1480, respectively. The software tool of the present invention, as described in more detail hereinabove, allows the musician or user to emulate the effects on the computer screen in anticipation of downloading and using the effects in the foot-operated device. In one configuration of desired components, the musician has connected CAPS icon 1422 to audio input 1440 via a line, generally designated by the reference numeral 1441. It should be understood that the software tools of the instant invention make this interconnectivity simple, e.g., by moving a cursor over the audio input 1440, whereupon the software enables the generation of a line therefrom, which is dragged to the desired connection point, which is the left side of the CAPS icon 1422, where a connectivity point is generated to receive the other end of the line 1441. It should be understood that the software would only enable the generation of permissible lines between compatible points, and disable inappropriate connections, as is well understood in the art.

With further reference to FIG. 14, line 1423 emanates from the right side of CAPS icon 1422 and connects to the left side of Guitarix icon 1426, as illustrated. Similarly, line 1451 extends from the second audio input 1450 and connects to the left side of the TAP icon 1424. Although the MIDI input 1460 in this embodiment is not used, it should, of course, be understood that in alternate embodiments this input may be employed in effects generation. Line 1425 extends from the right side of the TAP icon 1424, and extends to the same left side port of the Guitarix icon 1426, where both lines 1423 and 1425 input to generate a particular effect. Lastly, on the right side of the Guitarix icon 1426, lines 1427 and 1429 extend to audio outputs 1470 and 1480, respectively.

With the configuration of icons made in FIG. 14 and the interconnections therebetween, the user or musician can now run the software application to determine the effects. As described and illustrated hereinabove, this technique allows the composition of audio effect generators using multiple gadgets or devices (where the icons are representative thereof) in serial or parallel configurations, and combinations thereof. It should further be understood that the user of the tool displayed and described in connection with FIGS. 12-14 (and discussed in more detail hereinabove) may click on any of the aforesaid icons, whether in the working space 1410 or not, to bring up a virtual parameter screen, by which various parameters in the use of the particular icon can be adjusted, such as volume and adjustments made pursuant to the effect.

It should further be understood that the virtual representations made by the icons and connections can then be associated to any button in the foot-operated device to make that desired functionality operational in real life. In this manner, the instant invention is extremely flexible and instantly customizable, something impossible in the prior art. The LV2 audio standard makes this flexibility possible, and allows the inclusion of metadata in the effects programming, which is not possible in the prior art that employs the aforementioned VST standard, which is limited to audio signal processing and required hardcoded programming for connectivity in predetermined and limited configurations.

Figure 15:
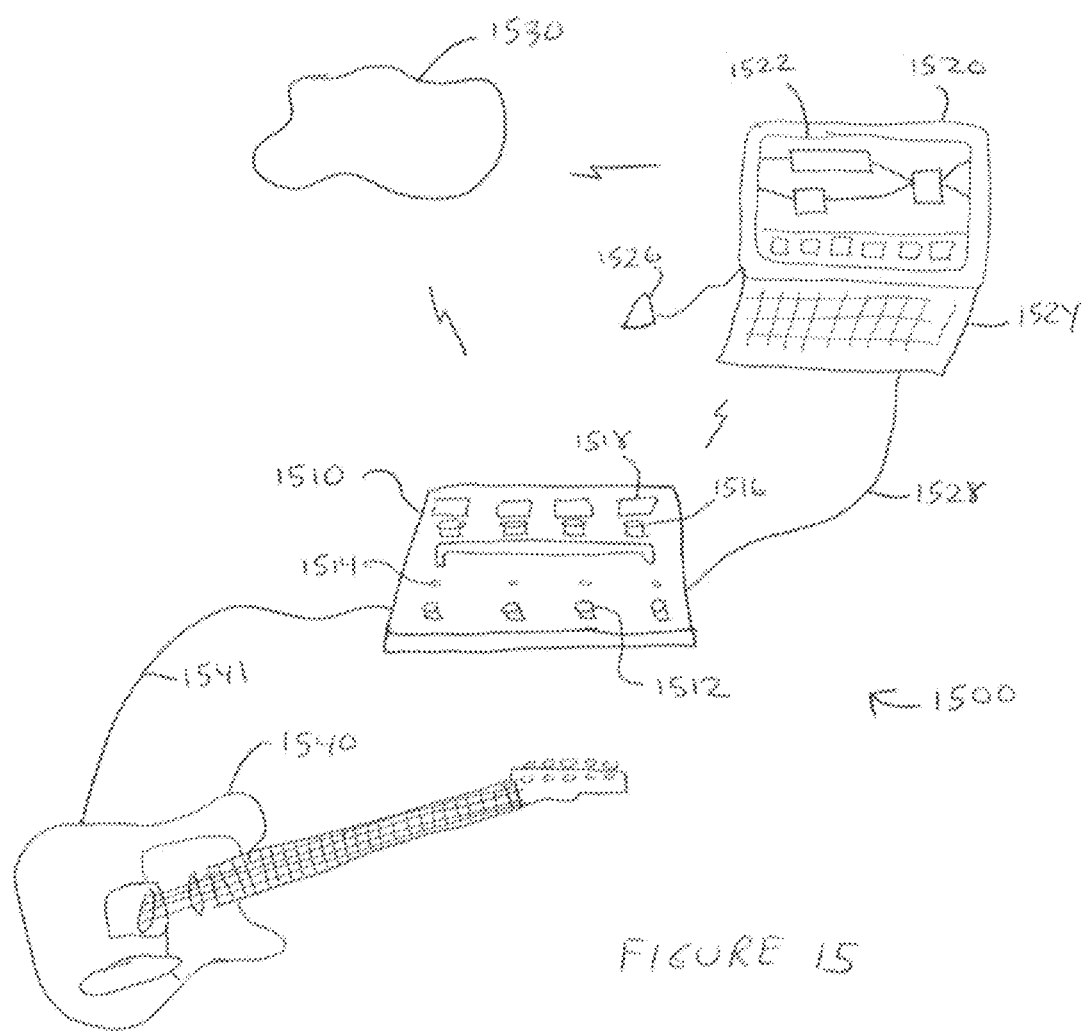
FIG. 15 illustrates an exemplary usage of the components of the present invention in an exemplary configuration.

With reference now to FIG. 15, there is shown an operational configuration of the device and paradigm of the instant invention, generally designated by the reference numeral 1500. A foot-operated device 1510 has a number of switches or buttons, generally designated by the reference numeral 1512, which are employed by the musician during a performance to initiate or activate a desired effect, i.e., the button is programmed for the effect. In this embodiment of the invention, there are four such switches, with associated activation lights 1514. i.e., that turn on when the effect is activated. Also shown are various knobs, generally designated by the reference numeral 1516 by which to adjust the effect, and respective displays to monitor same, generally designated by the reference numeral 1518. As described hereinabove, various effects are stored in memory within the device 1510, awaiting activation.

A PC 1520, which could alternatively be a tablet, smart phone or other such device, with a display, generally designated by the reference numeral 1522, has the icon configuration of FIG. 14 thereon. A keyboard 1524 and mouse 1526 are also shown. As also illustrated, the PC 1520 may wireline connect to the device 1510 via a connection line, generally designated by the reference numeral 1528, or connect wireless, as illustrated. The PC 1520 is also in communication with the Internet, generally designated by the reference numeral 1530, whether wirelessly or through a wireline connection. The device 1510 may also be in communication with the Internet 1530.

As also shown in FIG. 15, a guitar 1540 (or any other instrument as described hereinabove) may be connected to the device 1510, such as through a connection line 1541. In this fashion, a user may play the guitar 1540 to generate or augment the desired effect, which is recorded in the device 1540, the PC 1520 or elsewhere. The user or musician may thus, perhaps wearing headphones, play the instrument 1540 and create the desired effects, which are saved on the system. It should be understood that the user may play and record a variety of such effects for later initiation, each of which are distinguished according to the particular button or switch 1512 to which the effect is correlated. It should, of course, be understood that the particular icon configuration shown on the display 1522, can be downloaded and correlated to the aforesaid button or switch 1512 also. Furthermore, an effect can be downloaded from the Internet 1530 and directly installed in the device 1510 with a correlation made. It should be understood that such downloading, installation and button correlation can be almost instantaneous.

As discussed, the configurations can vary between the buttons 1512 and be modified or customized further with just a click, e.g., the particular effect configuration shown in FIG. 14 and on display 1522 can be readily modified, and the changes forwarded to the device 1510.

Although many of the aforementioned icons correlate to actual effects, it should, of course, be understood that with digital signals entirely new effects are readily possible. Indeed, users of the present invention, with the ease of downloading of desired effects configurations, can select new gadgets in the Cloud, i.e., over the Internet 1530, and also exchange effects configurations with other musicians, with a community, or post on websites and such.

The present invention has additional advantages over the prior art, where if you want to add effects, you often have to buy a new device or pedalboard 1510. The flexibility of the instant invention permits users to increase their sound possibilities, and extend those options to the Cloud. The wide option of the LV2 standard, with its large community of plug-in developers, also facilitates the wide adoption of the present invention. The ease of use of the interface, as discussed in connection with FIGS. 12-14, allowing arrangement and rearrangement of the effects, their order and connections, also facilitates the usage of the invention.

It should, of course, be understood that although the pedalboard 1510 shows four buttons or switches 1512, more or fewer such buttons are possible and useful in different contexts. For example, fewer may be useful to decrease the weight of the device. More may be added by use of extenders to augment the degree of control possible. Additional or alternate control may also be had by use of a pedal Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A foot-operated effects device comprising:
    a processor;
    a plurality of switches; and
    a memory,
    wherein said memory contains a plurality of audio effects therein, respective effects correlated to respective switches,
    wherein at least one of said plurality of audio effects is created by a user on a graphical user interface, said user in creating said at least one of said plurality of audio effects manipulating at least two icons on said graphical user interface to create said at least one of said plurality of audio effects, and
    wherein said at least two icons for said at least one of said plurality of audio effects are interconnected by said user on said graphical user interface, creating a configuration for employment using said foot-operated effects device, said configuration for said at least one of said plurality of audio effects being downloaded to said memory,
    whereby the toggling of a given switch by foot manipulation of a user initiates said at least one of said plurality of audio effects.

2. The foot-operated effects device according to claim 1, wherein said plurality of audio effects are modelled by said user on said graphical user interface.

3. The foot-operated effects device according to claim 2, wherein said plurality of audio effects are arranged in serial, at least two of said icons interconnected by said user on said graphical user interface being serially connected.

4. The foot-operated effects device according to claim 2, wherein said plurality of audio effects are arranged in parallel, at least two of said icons interconnected by said user on said graphical user interface being connected in parallel.

5. The foot-operated effects device according to claim 2, wherein the modelling by said user on said graphical user interface is in real time.

6. The foot-operated effects device according to claim 1, further comprising:
    a transceiver, said transceiver downloading at least one said audio effects into memory.

7. The foot-operated effects device according to claim 1, wherein said device employs an application program interface standard that includes metadata in effects programming.

8. The foot-operated effects device according to claim 1, wherein said plurality of effects includes metadata.

9. The foot-operated effects device according to claim 8, wherein said device employs plug & play capability.

* * * * *